United States Patent
Wolff

[15] 3,699,669
[45] Oct. 24, 1972

[54] RADAR LANDMASS SIMULATOR
[72] Inventor: Hans H. Wolff, Orlando, Fla.
[73] Assignee: The United States of America as represented by the Secretary of the Navy
[22] Filed: June 14, 1971
[21] Appl. No.: 152,846

[52] U.S. Cl. ............................................... 35/10.4
[51] Int. Cl. ............................................. G01s 9/00
[58] Field of Search ................................... 35/10.4

[56] References Cited

UNITED STATES PATENTS

| | | | |
|---|---|---|---|
| 3,291,884 | 12/1966 | Gray | 35/10.4 |
| 3,413,402 | 11/1968 | Marrero | 35/10.4 |
| 3,439,105 | 4/1969 | Ebeling et al. | 35/10.4 X |

*Primary Examiner*—Malcolm F. Hubler
*Attorney*—Richard S. Sciascia et al.

[57] ABSTRACT

In a radar landmass simulator having one photographic memory for storing elevation information and another photographic memory for storing reflectivity information, surplus reflectivity storage is used to store multiplying factors for expanding the elevation information. The multiplying factors are combined with the elevation information to extend the range of usable elevations. Since a surplus of reflectivity storage is available, the net effect is to increase the available elevation storage by a factor of three or more with no increase in the size of the memories.

4 Claims, 5 Drawing Figures

RADAR LANDMASS SIMULATOR

BACKGROUND OF THE INVENTION

The invention is in the field of simulation of ground mapping radars for training devices and the like.

Among the different approaches to the simulation of radar signals the recording of elevation (topographical) and reflectivity (cultural) data has so far been most successfully undertaken by using photographic plates as information storage devices which are scanned by a flying spot scanner or equivalent. The derived data is processed into elevation and reflectivity signals to drive a radar display.

A system known as the factored transparency system is used quite extensively. In this system a pair of photographic plates is used, one of which contains the elevation data, the other one the reflectivity data. Data is stored by processing the plate to different densities or shades of gray. A photoelectric read-out system develops signals of intensities proportional to the density of the spot on the plate being scanned. One of the serious limitations of this system is a limited resolution of elevation data that can be readily extracted from the photographic recording. Noise and other limitations lead to about 29 distinguishable levels. Land elevations may vary from below sea level to above 30,000 feet. Therefore in radar trainers elevation information must be encoded in increments of several hundred feet. This has impaired the resolution, realism, and effectiveness, of prior art radar landmass simulators used for radar training.

Many efforts have been made to extend the scale of elevation information display to obtain better resolution. Among many other expedients, multicolored transparencies have been used to store elevation information. For example, U.S. Pat. No. 3,028,684 to S. M. Khanna et al teaches the use of three different colors of four different intensities in a single transparency to obtain sixty-four permutations of elevation information. U.S. Pat. No. 3,294,891 to J. J. Antul et al teaches the use of three different colors in a single transparency as well as the use of two colors and separate read-out circuitry to store and retrieve elevation information in a coarse-fine relationship. Unfortunately, the use of these and other prior art expedients such as numerical codes, etc., is penalized by a requirement for increased complexity in the preparation of transparencies and in recording and read-out equipment. Elaborate color filtering, cross talk eliminating, and information processing means, are required.

Unlike Khanna, Antul, and others, applicant overcomes the lack of resolution in the elevation information display of prior art simulators by recognizing the existence of and utilizing superfluous storage capacity in the reflectivity information storage device which is available in existing simulators. Seven or eight distinguishable degrees of radar reflectivity are adequate to identify the different reflectivities required in a radar trainer. Therefore, a photographic memory used for storing reflectivity information only has a surplus of storage capability.

Applicant solves the problem of inadequate elevation information storage available by providing novel circuitry for utilizing some of the superfluous reflectivity information storage available for additional elevation storage capacity.

SUMMARY OF THE INVENTION

To increase the number of distinguishable elevation levels in a radar trainer, the full range of elevations is divided into several groups. Each of the groups uses the full range or almost the full range of density levels, for example, range one covers from 0 to 2,000 feet; range two covers from 2,000 to 6,000 feet; and range three covers from 6,000 to 12,000 feet. If the darkest density in the elevation data plate is used for the lowest elevation the same level on the elevation data plate could represent 0 feet elevation, 2,000 feet elevation, and 6,000 feet elevation. To distinguish between the different groups (in this case three groups) of elevation, the second plate which has to carry the reflectivity data is used. The reflectivity information can be much coarser than the elevation information, in fact eight distinguishable levels of reflectivity information are completely satisfactory. The reflectivity plate supplies not only the reflection but also the group information needed to distinguish between the different groups in the elevation plate. That is, the same reflectivity is represented on the reflectivity plate by three different levels of density depending upon to which elevation group it relates.

Assuming for example, that the reflectivity plate carries 27 distinguishable levels of gray the levels from one through nine represent nine different reflectivity data for the elevation group. The gray levels ten through eighteen represent the reflectivity data for the second elevation group, whereas the reflectivity gray scales from levels nineteen through 27 represent the reflectivity data for elevation group three.

DESCRIPTION OF THE PREFERRED EMBODIMENT

Figure 1:
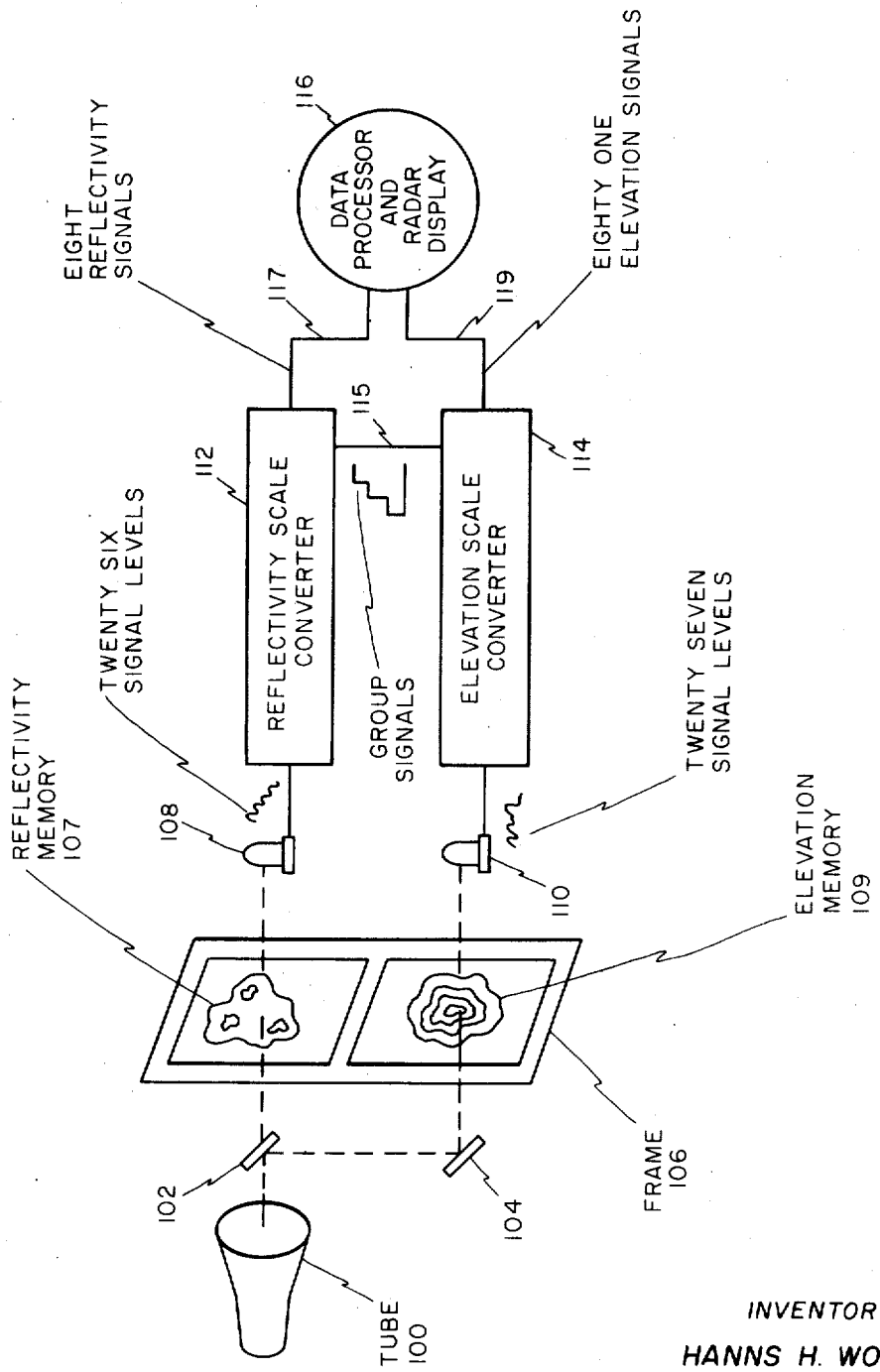
FIG. 1 is a functional diagram of the invention.

FIG. 1 illustrates the principles of the invention. A light source such as a tube 100 provides a scanning beam which is divided and directed by optical elements 102 and 104 into two beams which scan a reflectivity memory 107 and an elevation memory 109. Memories 107 and 109 are photographic transparencies wherein data is recorded as discrete densities or shades of gray fixed in a frame 106 which may be moved in a plane normal to the scanning beams by means not shown. Other equivalent scanning techniques may be used. Generally in a radar training device the memories are scanned in synchronism with the simulated flight of an aircraft housing a radar display. Light transmitted through (or reflected by) memories 107 and 109 strikes two respective photomultipliers 108 and 110 which develop output signals in response thereto. Photographic memories 107 and 109 each have, for example, up to 27 density levels, therefore the output signals from 108 and 110 will have up to 27 intensity levels. These output signals are inputs to a reflectivity scale converter 112 and an elevation scale converter 114 respectively. Converter 112 is arranged to convert 26 input levels into eight output reflectivity signals and into three group signals. Three group signals are furnished to the elevation scale converter 114 over a line 115 and the eight reflectivity signals are furnished to a radar display 116 over a line 117. "Line" 117 and other lines shown may comprise a multiple channel cable. The 27 elevation scale levels and the three group signals are combined in elevation scale converter 114 to obtain an output signal having 81 values which is forwarded to data processor and radar display 116 over a line 119.

Figure 2:
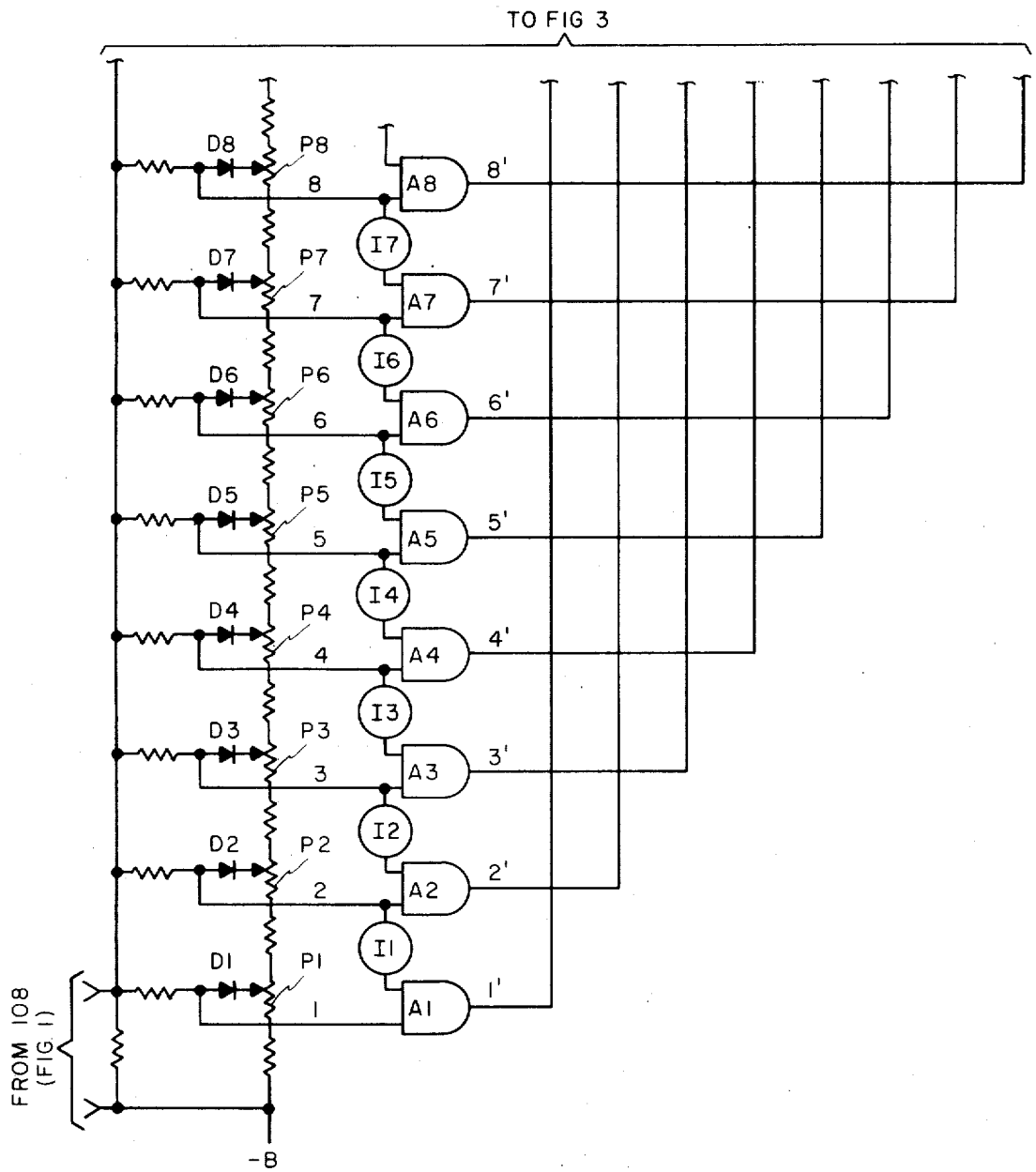
FIGS. 2–4 show a circuit schematic of the reflectivity scale converter shown in FIG. 1.
Figure 3:
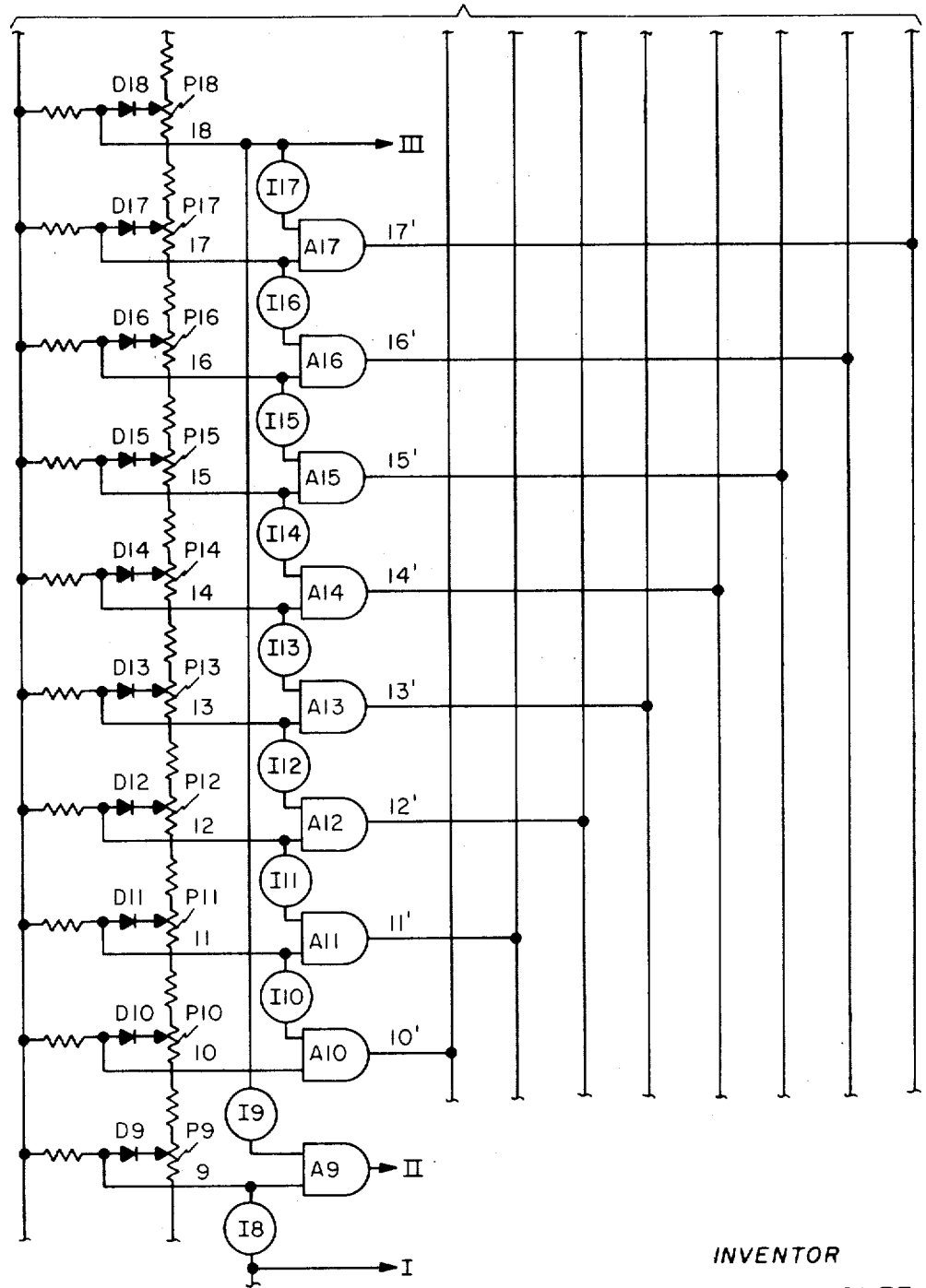
Figure 4:
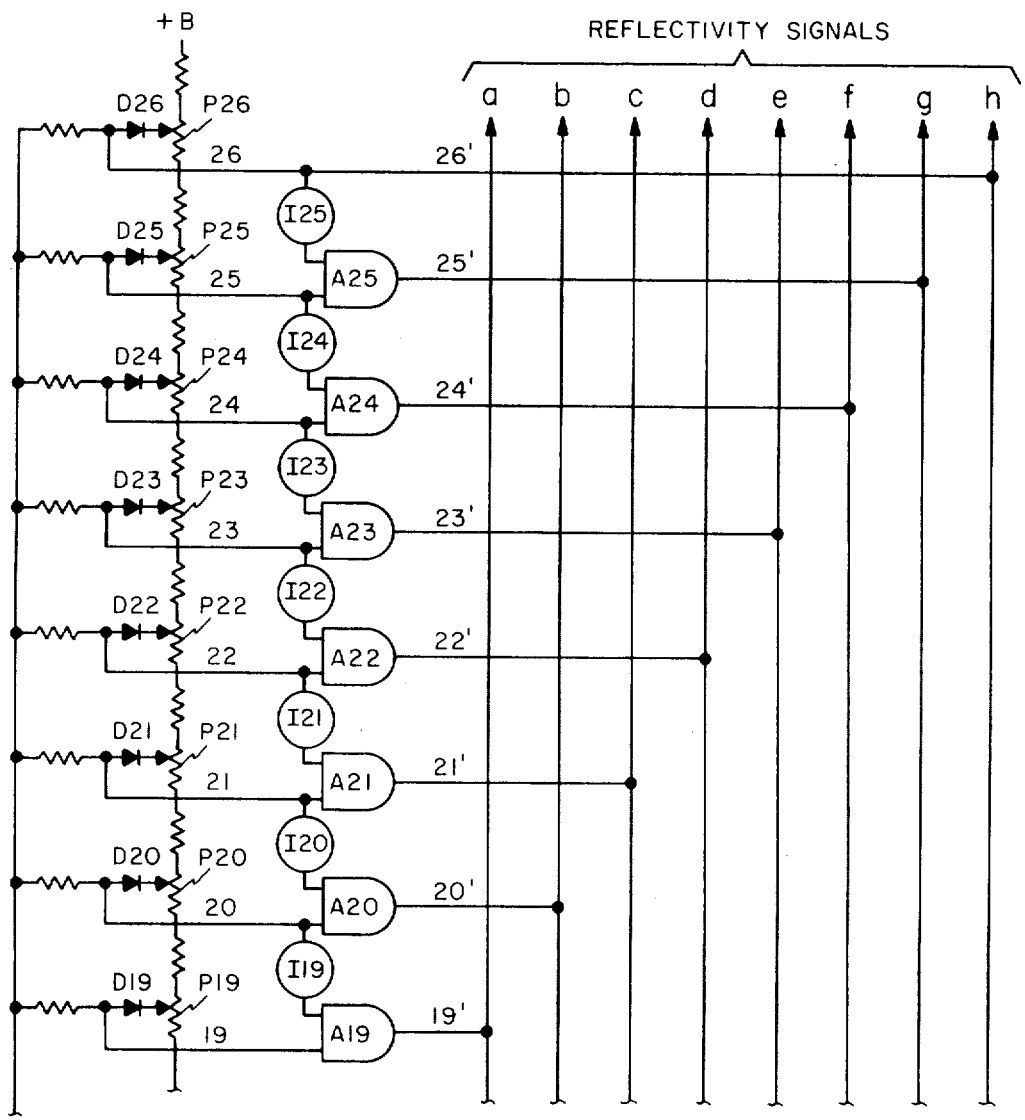

As shown in FIGS. 2-4, the reflectivity read-out signal from photomultiplier 108 (FIG. 1) feeds into a potentiometric system P1–P26 that can be adjusted for 26 different gray levels and a resistor diode system D1-D26 which provides signals up to that gray level which is scanned at any one moment. These signals form one input to a series of appropriately biased AND circuits A1–A25, one assigned to each gray level, whereas the other AND circuit input comes via a signal inverter I1, I2, I3, etc., from the next higher gray level signal line. Thus only that AND circuit produces a signal which is associated with the gray level presently scanned. If, for example, the gray level 4 is scanned the next higher level 5 does not provide a voltage drop on the resistor in line 5 and the inversion of the potential from line 5 in I4 and the signal from line 4 feed into an AND circuit A4 which is appropriately biased (i.e. by a threshold device) to provide the signal 4'. The system as shown therefore provides one of 24 signals 1' – 8', 10' – 17', and 19' – 26'.

The inverted signal from line 9 represents group signal I. That is as long as the gray level does not exceed gray level 8, a signal I is generated.

For gray signal levels 10 – 17 a group signal II is generated by an AND circuit A9 which is fed by the gray level 9 signal and the inversion of the gray level 18 signal.

Finally, the gray signal line 18 provides the group signal III.

Since the derived reflectance signals 1' – 8', 10' – 17', and 19' – 26' provide respective data and only one of the respective AND circuits provides a signal at any one time they can be combined and provide the eight different reflectance signals $a$, $b$, $c$, $d$, $e$, $f$, $g$, and $h$ which can be processed in a digital system or converted into analog signals that can be processed the same way the conventional radar landmass transparency system processes the data from the reflectance read-out channel.

Figure 5:
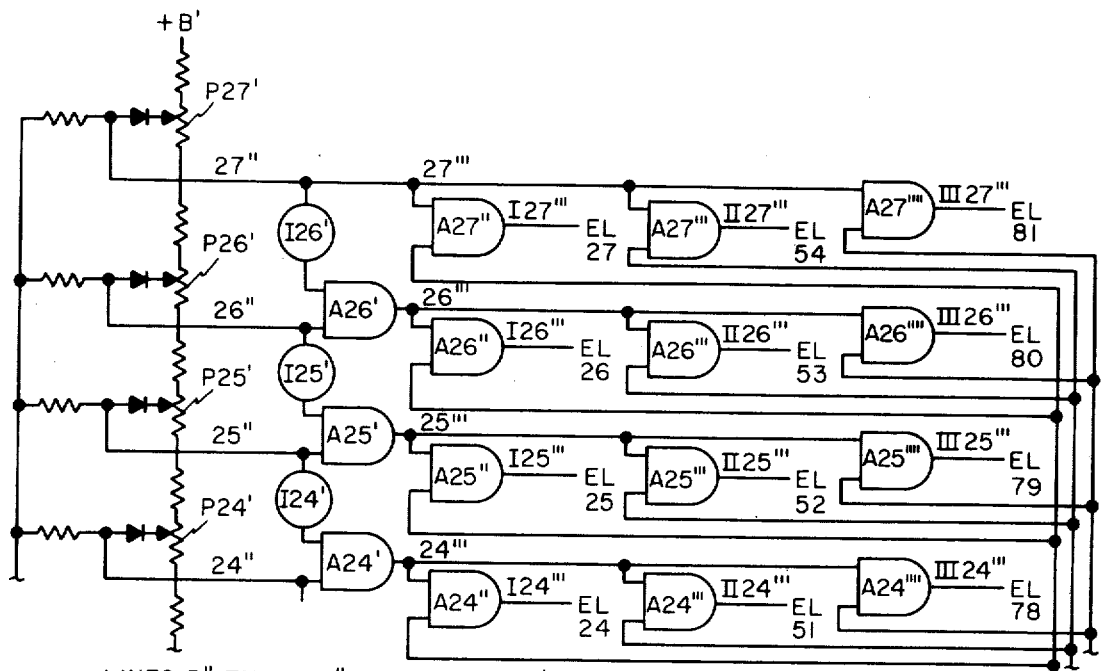
FIG. 5 is a circuit schematic of the elevation scale converter shown in FIG. 1.
Figure 5:
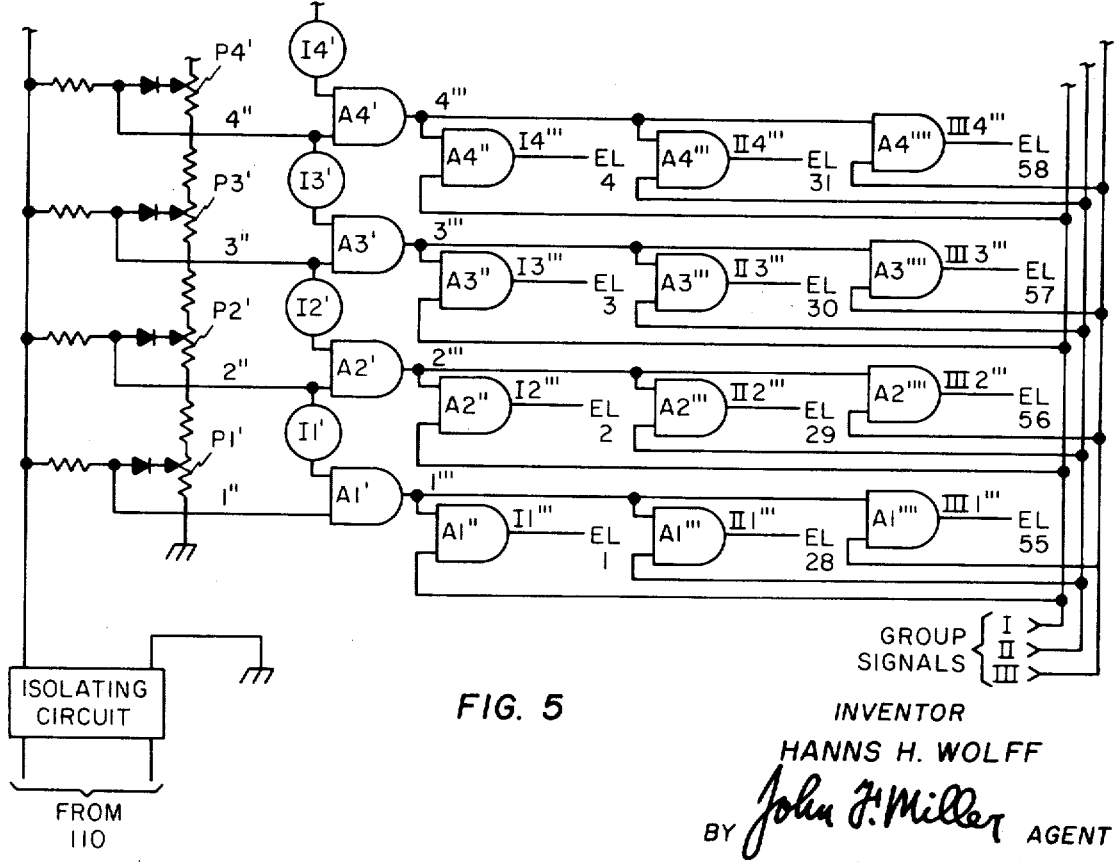

FIG. 5 shows a preferred embodiment which generates 3 times 27, that is 81 elevation levels from the 27 gray levels of the elevation plate and three group signals derived from the reflectance plate.

The elevation read-out signal from photomultiplier 110 (FIG. 1) feeds, preferably via a cathode follower system, a potentiometric system P1' – P27' that is adjusted to provide signals up to the gray level which is scanned at any one moment. These gray level signals are indicated in the drawing as lines 1" to 27". Signals 1" to 26" provide one signal to 26 AND circuits A1' – A26' that are assigned one each to each line. The other input to these AND circuits comes from lines 2" to 27" via inverters I1' – I26', that is at any one time only one of the AND circuits provides one of the signals 1''' to 26'''. The signal 27''' is derived directly from channel 27".

Each of the signals 1''' to 27''' provides the inputs to three AND circuits A1", A1''', A1'''', etc. The other input of these three AND circuits is provided by the group signal lines I, II, and III from the reflectivity scale converter circuit of FIG. 2. Therefore, only one of the 81 AND circuits associated with the group signals I, II, and III is providing a signal at any one time and thereby defines definitely one of 81 different elevation levels.

All signals thereby derived can be processed through a computer or after conversion into analog signals in the same fashion in which the processing has been done in the previously mentioned system.

Since the signals provided from the read-out to the potentiometric systems both in the reflectance and in the elevation channels may draw a wide range of currents, a cathode follower system may be desirable as the input system.

Furthermore, since the logic circuitry used in the two scanning systems demands identical base levels a signal converter system may be desirable to adjust the signal base and the signal levels of the I, II, III signals to be compatible with the 1''' to 27''' signals.

The 81 levels of elevation do not have to represent equal intervals. For example, eight levels could be used for ground level followed by seven levels increasing 50 feet each followed by eight levels increasing by 75 feet each, 15 levels increasing by 100 feet each, 20 levels of 150 feet each, and finally 30 levels of 200 feet each.

Thus the system could be used simultaneously for low level flight including terrain avoidance, for medium altitude and high altitude flight. The system thus would be able to adequately simulate the capability of advanced radar systems.

The number of gray levels described for the reflectivity plate and the elevation plate as well as the number of groups described for the reflectivity plate are examples only. Depending on the specific purpose of the simulation system plates and its desired characteristics, selection of the plate emulsion has to be made which is compatible with the design parameters of the simulation system.

What is claimed is:

1. In a radar landmass simulator having a first memory for storing radar reflectivity information and a second memory for storing terrain elevation information to be displayed on a radar display, the improvement comprising:

a first memory modified to store both reflectivity information and additional elevation information, means for reading out said reflectivity information and said additional elevation information from said first memory and said elevation information from said second memory simultaneously, combining means for combining said additional elevation information and said elevation information into combined elevation information, and means for transmitting said combined elevation information to said radar display to increase the range of elevations displayed.

2. The apparatus of claim 1, wherein said elevation information is comprised of a selected number of discrete signal levels and wherein said combined elevation information is comprised of a number of discrete signal levels greater than said selected number.

3. The apparatus of claim 2, said combining means including a reflectivity scale converter for converting said reflectivity information and said additional elevation information into a number of reflectivity signals and a number of group signals, and an elevation scale converter for combining said elevation information and said group signals into said combined elevation information.

4. The apparatus of claim 3 and including connecting means for transmitting said group signals from said reflectivity scale converter to said elevation scale converter, said reflectivity signals to said radar display and said combined elevation information to said radar display, the arrangement being such that the number of discretely different reflectivity signals transmitted to said radar display is less than the storage capacity of said first memory and the number of discrete signal levels in said combined elevation information transmitted to said radar display is greater than the storage capacity of said second memory.

* * * * *